United States Patent
Mukherjee et al.

(10) Patent No.: US 9,661,307 B1
(45) Date of Patent: May 23, 2017

(54) DEPTH MAP GENERATION USING MOTION CUES FOR CONVERSION OF MONOSCOPIC VISUAL CONTENT TO STEREOSCOPIC 3D

(71) Applicant: Google Inc., Mountain View, CA (US)

(72) Inventors: Debargha Mukherjee, Sunnyvale, CA (US); Chen Wu, Mountain View, CA (US); Yuchen Xie, San Diego, CA (US); Meng Wang, Brookline, MA (US)

(73) Assignee: Google Inc., Mountain View, CA (US)

( * ) Notice: Subject to any disclaimer, the term of this patent is extended or adjusted under 35 U.S.C. 154(b) by 458 days.

(21) Appl. No.: 13/632,489

(22) Filed: Oct. 1, 2012

Related U.S. Application Data

(60) Provisional application No. 61/560,064, filed on Nov. 15, 2011.

(51) Int. Cl.
*H04N 13/02* (2006.01)
*H04N 7/18* (2006.01)
*H04N 13/00* (2006.01)
*G06K 9/00* (2006.01)

(52) U.S. Cl.
CPC ............ *H04N 13/026* (2013.01); *G06K 9/00* (2013.01); *G06K 9/00771* (2013.01); *H04N 7/18* (2013.01); *H04N 13/0022* (2013.01)

(58) Field of Classification Search
CPC ............ H04N 13/026; H04N 13/0022; H04N 13/0271; H04N 13/0484; H04N 13/0207; H04N 13/0221; H04N 13/0275; G01B 7/26
USPC .......................................................... 348/44
See application file for complete search history.

(56) References Cited

U.S. PATENT DOCUMENTS

| | | | |
|---|---|---|---|
| 6,785,329 B1 * | 8/2004 | Pan | G06K 9/342 375/240.08 |
| 7,660,439 B1 * | 2/2010 | Lu | G06K 9/00711 348/699 |
| 8,213,711 B2 | 7/2012 | Tam et al. | |
| 8,249,333 B2 | 8/2012 | Agarwal et al. | |
| 8,330,801 B2 | 12/2012 | Wang et al. | |
| 8,411,931 B2 | 4/2013 | Zhou et al. | |
| 8,488,868 B2 | 7/2013 | Tam et al. | |
| 8,531,507 B2 | 9/2013 | Provitola | |

(Continued)

OTHER PUBLICATIONS

Khan, et al. "Image-based material editing," ACM Transactions on Graphics, vol. 25, No. 3, pp. 654-663, Proceedings of the ACM SIGGRAPH conference, 2006. Section: 2.1.

(Continued)

*Primary Examiner* — Jay Patel
*Assistant Examiner* — Marnie Matt
(74) *Attorney, Agent, or Firm* — Lowenstein Sandler LLP

(57) ABSTRACT

An image converter identifies a subset of frames in a two-dimensional video and determines a global camera motion value for the subset of frames. The image converter also determines a dense motion value for a plurality of pixels in the subset of frames and compares the global camera motion value and the dense motion value to calculate a rough depth map for the subset of frames. The image converter further interpolates, based on the rough depth map, a depth value for each of the plurality of pixels in the subset of frames and renders a three-dimensional video from the subset of frames using the depth value for each of the plurality of pixels.

20 Claims, 7 Drawing Sheets

(56) References Cited

U.S. PATENT DOCUMENTS

| | | |
|---|---|---|
| 8,644,596 B1 | 2/2014 | Wu et al. |
| 8,953,874 B2 | 2/2015 | Wu et al. |
| 2002/0191841 A1 | 12/2002 | Harman |
| 2005/0053276 A1 | 3/2005 | Curti et al. |
| 2005/0104964 A1* | 5/2005 | Bovyrin .................. G06K 9/38 348/155 |
| 2006/0187345 A1* | 8/2006 | Soto ..................... H04N 7/0132 348/452 |
| 2006/0274302 A1 | 12/2006 | Shylanski et al. |
| 2007/0024614 A1* | 2/2007 | Tam ...................... G06T 7/0067 345/419 |
| 2007/0047809 A1* | 3/2007 | Sasaki ................ G06K 9/00791 382/170 |
| 2007/0146232 A1 | 6/2007 | Redert et al. |
| 2008/0199044 A1 | 8/2008 | Tsurumi |
| 2009/0003687 A1* | 1/2009 | Agarwal ............... G06T 7/0024 382/154 |
| 2009/0116732 A1* | 5/2009 | Zhou .................. H04N 13/0029 382/154 |
| 2009/0238462 A1* | 9/2009 | Feris .................. G06K 9/00771 382/190 |
| 2009/0310828 A1 | 12/2009 | Kakadiaris et al. |
| 2009/0322860 A1 | 12/2009 | Zhang et al. |
| 2010/0080448 A1 | 4/2010 | Tam et al. |
| 2010/0208986 A1* | 8/2010 | Cobb ................. G06K 9/00771 382/165 |
| 2010/0215251 A1* | 8/2010 | Klein Gunnewiek ........ H04N 13/0022 382/154 |
| 2010/0316257 A1* | 12/2010 | Xu ..................... G06K 9/00771 382/103 |
| 2011/0026808 A1 | 2/2011 | Kim et al. |
| 2011/0026840 A1 | 2/2011 | Tao et al. |
| 2011/0043540 A1 | 2/2011 | Fancher et al. |
| 2011/0050853 A1* | 3/2011 | Zhang .................. H04N 13/026 348/44 |
| 2011/0096832 A1* | 4/2011 | Zhang .................. G06T 7/0071 375/240.08 |
| 2011/0150287 A1* | 6/2011 | Flosdorf ............... G06T 7/2033 382/107 |
| 2011/0181588 A1 | 7/2011 | Barenbrug et al. |
| 2011/0210969 A1* | 9/2011 | Barenbrug ............ G06T 7/0053 345/419 |
| 2011/0242279 A1 | 10/2011 | Redert et al. |
| 2011/0255775 A1 | 10/2011 | McNamer et al. |
| 2012/0013711 A1* | 1/2012 | Tamir .................. H04N 13/026 348/46 |
| 2012/0214463 A1 | 8/2012 | Smith et al. |
| 2012/0293624 A1* | 11/2012 | Chen .................. H04N 13/0022 348/46 |
| 2013/0106837 A1 | 5/2013 | Mukherjee et al. |
| 2013/0147911 A1 | 6/2013 | Karsch et al. |
| 2013/0176445 A1* | 7/2013 | Streeter .................. G01S 17/36 348/208.1 |
| 2013/0215239 A1 | 8/2013 | Wang et al. |

OTHER PUBLICATIONS

Grundmann et al., Auto-Directed Video Stabilization with Robust L1 Optimal Camera Paths. IEEE Conference on Computer Vision and Pattern Recognition (CVPR), 2011.

Brox et al., "High Accuracy Optical Flow Estimation Based on a Theory for Warping." European Conference on Computer Vision (ECCV), 2004.

Zhang et al., "Shape from shading: a survey." IEEE Transactions on Pattern Analysis and Machine Intelligence 21, 8, 690, 1999.

Zhang et al., "Consistent Depth Maps Recovery from a Video Sequence". IEEE Transactions on Pattern Analysis and Machine Intelligence (TPAMI), 31 (6): 974-988, 2009.

Fehn, C., "Depth-image-based rendering (DIBR), compression, and transmission for a new approach on 3D-TV," Stereoscopic Displays and Virtual Reality Systems XI., vol. 5291, pp. 93-104, May 2004.

Langer et al. "Depth Discrimination from shading under diffuse lighting." Perception vol. 29, pp. 649-660, 2000.

Saxena et al. "3D-Depth Reconstruction from a Single Still Image" International Journal of Computer Vision (IJCV), 2007.

A. Saxena, M. Sun, and A.Ng. Make3D: Learning 3D Scene Structure from a Single Still Image. IEEE Transactions on Pattern Analysis and Machine Intelligence (TPAMI), 2008.

A. Torralba, R. Fergus, W.T. Freeman, "80 million tiny images: a large dataset for non-parametric object and scene recognition", IEEE Transactions on Pattern Analysis and Machine Intelligence, vol. 30(11), 2008.

B. Liu, S. Gould, and D. Koller. Single Image Depth Estimation From Predicted Semantic Labels. IEEE Conference on Computer Vision and Pattern Recognition (CVPR), 2010.

M. Guttmann, L. Wolf, and D. Cohen-Or. Semi-Automatic Stereo Extraction From Video Footage. IEEE International Conference on Computer Vision (ICCV), 2009.

M. Liao, J. Gao, R. Yang, and M. Gong. Video Stereolization: Combining Motion Analysis with User Interaction. IEEE Transactions on Visualization and Computer Graphics (TVCG), 2011.

International Search Report and Written Opinion for PCT/US2012/063435, mailed Dec. 27, 2012.

USPTO; Office Action for U.S. Appl. No. 13/478,449 mailed Oct. 4, 2013.

USPTO; Notice of Allowance for U.S. Appl. No. 13/527,415, mailed Sep. 27, 2013.

Sergey Weinstein, 3-D Stereoscopic Reconstruction using Structured Light, May 19, 2006, http://cslab1.bc.edu/-csacademics/pdf/06SergeyWeinstein.pdf.

* cited by examiner

DEPTH MAP GENERATION USING MOTION CUES FOR CONVERSION OF MONOSCOPIC VISUAL CONTENT TO STEREOSCOPIC 3D

RELATED APPLICATIONS

This application is related to and claims the benefit of U.S. Provisional Patent Application No. 61/560,064, filed Nov. 15, 2011, which is hereby incorporated by reference herein.

TECHNICAL FIELD

This disclosure relates to the field of image processing and, in particular, to conversion of monoscopic visual content to stereoscopic 3D.

BACKGROUND

Advances in display technology have caused display devices capable of conveying a stereoscopic perception of three-dimensional (3D) depth to a view to become increasingly common. These 3D displays may be found in high-definition (HD) television sets, mobile phones, gaming devices, and other computing devices. The growing number of 3D displays has led to a need for additional 3D visual content (e.g., images, video). Conventionally, creating 3D content has been a difficult and time consuming process. A content creator, for example, would capture a subject using two cameras, combine the video or images from each camera, and use special software to make the 3D effect look accurate. This typically includes a lengthy, highly technical and expensive manual process. Conversion of two-dimensional (2D) images and video to 3D has been performed; however, conventional conversion techniques may not be efficient at converting a large number of images or video. In addition, conventional techniques are limited to converting specific types of images and video and may not be used for general 2D to 3D conversion tasks.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, an image converter identifies a subset of frames in a two-dimensional video and determines a global camera motion value for the subset of frames. The image converter also determines a dense motion value for multiple pixels in the subset of frames and compares the global camera motion value and the dense motion value to calculate a rough depth map for the subset of frames. The image converter further interpolates, based on the rough depth map, a depth value for each of the multiple pixels in the subset of frames and renders a three-dimensional video from the subset of frames using the depth value for each of the multiple pixels.

In one implementation, a method includes identifying a subset of frames in a two-dimensional video, determining a global camera motion value for the subset of frames, determining a dense motion value for multiple pixels in the subset of frames, and comparing, by a processing device, the global camera motion value and the dense motion value to calculate a rough depth map for the subset of frames. The method further includes interpolating, based on the rough depth map, a depth value for each of the multiple pixels in the subset of frames, and rendering a three-dimensional video from the subset of frames using the depth value for each of the multiple pixels.

BRIEF DESCRIPTION OF THE DRAWINGS

The present disclosure is illustrated by way of example, and not by way of limitation, in the figures of the accompanying drawings.

DETAILED DESCRIPTION

Figure 1:
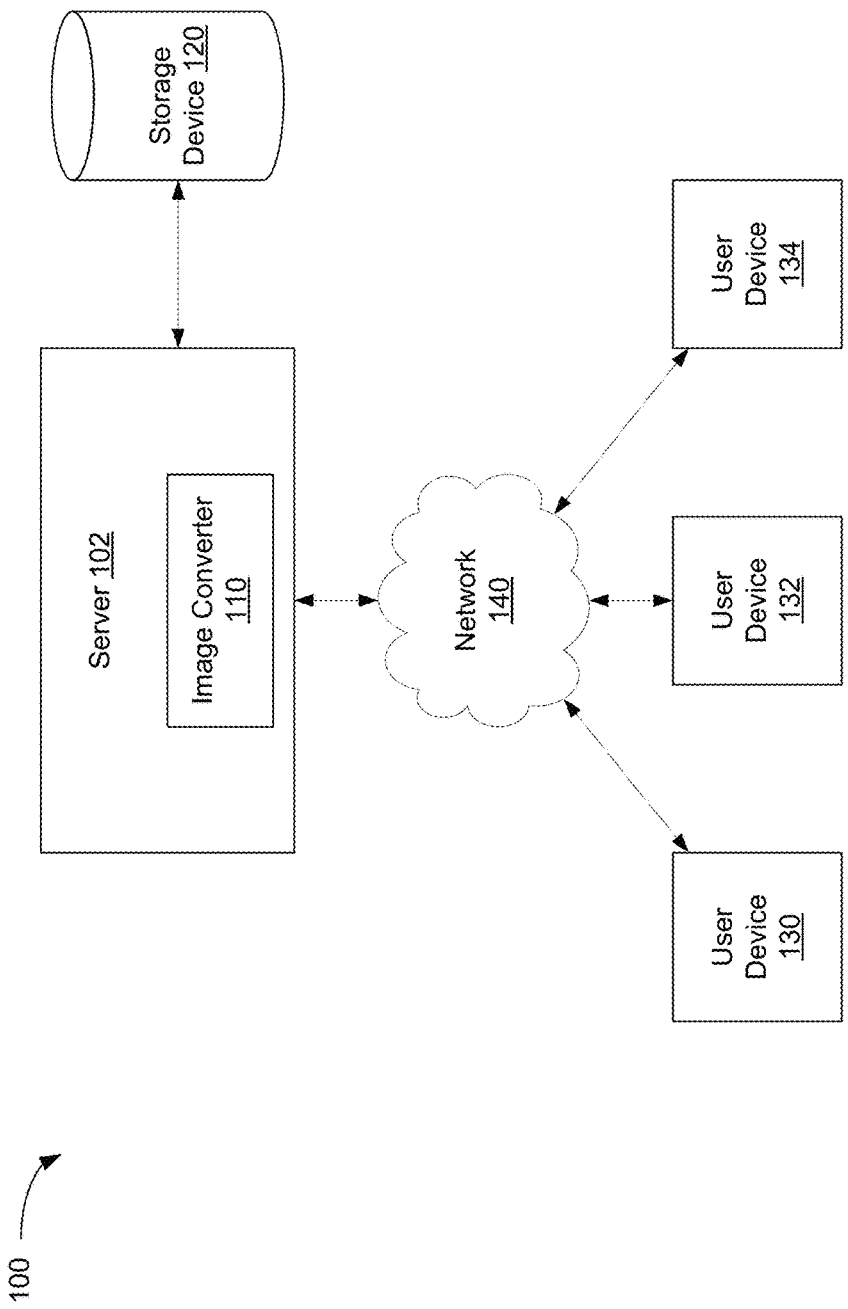
FIG. 1 is a block diagram illustrating an exemplary network architecture in which implementations of the present invention may be implemented.

Implementations are described for generating a depth map for a two-dimensional (2D) video using motion cues. The depth map may include depth values for pixels of the 2D input video and may be used to convert the 2D input video into a three-dimensional (3D) output video. The 2D input video may be provided by a user or selected from a database of available videos. The image converter described herein can identify a sequence of frames from the 2D video and determine an estimate of the motion of objects in those frames (i.e., a motion cue). The image converter can use that motion cue to generate depth values for the frames which may be used to convert the video to 3D. While details are provided herein specifically relating to videos as an example for clarity of explanation, it shall be appreciated that such details may be equally applicable to other types of media, e.g., audio (e.g., music), images, documents, text (e.g., tweets), flash-content, etc., as applicable.

The frames of the 2D video may have several types of motion that affect the motion cue determined by the image converter. In certain implementations, the camera used to capture a video may be moving at the time it is recording a scene or subject. For example, the camera may be held by a person in a vehicle while filming an exterior scene, or the camera may be stationary but panning across a scene (e.g., at a sporting event) to follow a subject. The result of this camera motion may be referred to as the global camera motion. Dense motion includes the total optical flow for each pixel in the frames of the 2D input video. In cases where the camera is moving, it may appear that every pixel in the frames has some dense motion. The image converter can account for the camera motion by subtracting the global camera motion from the dense motion. The result may be a local motion value for each pixel (or a subset of the pixels).

The local motion value is representative of the movement of an object within the scene relative to the camera. The image converter identifies these moving objects and assigns them a depth value to cause them to "pop up" in the converted 3D video.

In many videos, moving objects may typically be in the foreground of the scene, while the background is relatively static. The image converter can detect the motion of these moving foreground objects and assign depth values so that the objects "pop out" to give better 3D visual effects. The image converter works on the assumption that for two objects moving at the same speed and in the same direction, the closer the object is to the viewpoint (i.e., the camera), the larger the optical flow (i.e., local motion values) in the recorded video will be. In addition, moving objects generally have a higher saliency (i.e., they visually stand out more than neighboring static objects). Since views tend to focus on the moving objects in their view, especially against a static background, making the moving objects "pop up" may be more important than making other parts (e.g., the background) do so.

Implementations of the conversion techniques described herein provide for fully automatic conversion of 2D visual content to 3D. This can allow an individual to avoid the costly and time-intensive processes of capturing a 3D video or manually converting an existing 2D video to 3D. The use of a feature-to-depth mapping function, as will be described below, allows for a more accurate prediction of the depth values for the image. In turn, this leads to a more accurate and realistic rendering of the 3D output video.

FIG. 1 is a block diagram illustrating an exemplary network architecture in which implementations of the present disclosure may be implemented. The network architecture 100 can include one or more servers 102 communicating with one or more user devices 130, 132, 134 over one or more networks 140, according to one implementation. Network 140 can be a local area network (LAN), a wireless network, a telephone network, a mobile communications network, a wide area network (WAN), such as the Internet, or similar communication system. User devices 130, 132, 134 may be any type of computing device including server computers, gateway computers, desktop computers, laptop computers, mobile communications devices, cell phones, smart phones, hand-held computers, tablets, or similar computing devices. The user devices 130, 132, 134 may be variously configured with different features to enable viewing of visual content, such as images, videos, etc.

Server 102 may include a network-accessible server-based functionality, various data stores, and/or other data processing equipment. The server 102 may be implemented by a single machine or a cluster of machines. Server 102 may be hosted by, for example, computer system 700 of FIG. 7. In one implementation, server 102 includes image converter 110. Image converter 110 can receive a two-dimensional (2D) input image or video (e.g., from a user or a computer application program) that should be converted to a three-dimensional (3D) output image or video. Using motion cues for the 2D input video and a corresponding feature-to-depth mapping data store in storage device 120, which may store various feature-to-depth mapping functions, image converter 110 can automatically generate the 3D output video, as will be described below.

In one implementation, storage device 120 includes an image data store including a number of 3D images or videos as well as, possibly, a number of 2D images or videos. Image converter 110 can extract motion information from the 2D videos and use that motion information to convert the 2D videos to 3D. In many videos, moving objects may typically be in the foreground of the scene, while the background is relatively static. Image converter 110 can detect the motion of these moving foreground objects and assign depth values so that the objects "pop out" to give better 3D visual effects. Image converter works on the assumption that for two objects moving at the same speed and in the same direction, the closer the object is to the viewpoint (i.e., the camera), the larger the optical flow (i.e., motion values) in the recorded video will be. In addition, moving objects generally have a higher saliency (i.e., they visually stand out more than neighboring static objects). Since views tend to focus on the moving objects in their view, especially against a static background, making the moving objects "pop up" may be more important than making other parts (e.g., the background) do so.

In response to a request from a user (e.g., received through one of user devices 130, 132, 134), image converter 110 can convert one or more of the 2D images or videos to 3D. In another implementation, a user may provide one or more 2D videos to be converted that were not previously stored in storage device 120. Image converter 110 can determine motion values of objects in the video and calculate depth values based on the motion values. As will be described below, using the depth values, image converter 110 can automatically generate a 3D output video based on the 2D input video.

In one implementation, server 102 may include image converter 110 and storage device 120. In another implementation, storage device 120 may be external to server 102 and may be connected to server 102 over a network or other connection. In other implementations, server 102 may include different and/or additional components which are not shown to simplify the description. Storage device 120 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Figure 2:
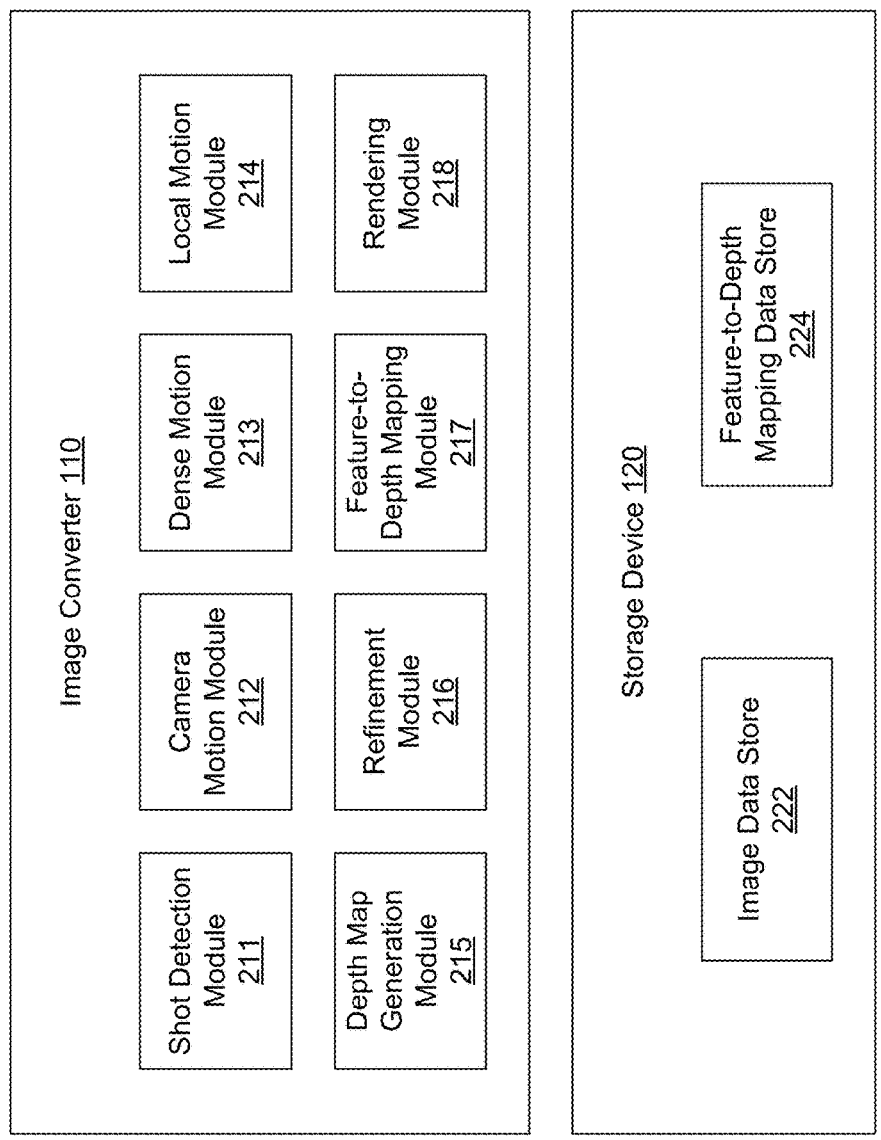
FIG. 2 is a block diagram illustrating an image converter for conversion of monoscopic visual content to stereoscopic 3D, according to some implementations.

FIG. 2 is a block diagram illustrating an image converter for conversion of monoscopic visual content to stereoscopic 3D, according to some implementations of the present disclosure. In one implementation, image converter 110 includes shot detection module 211, camera motion module 212, dense motion module 213, local motion module 214, depth map generation module 215, refinement module 216, feature-to-depth mapping module 217, and rendering module 218. This arrangement of modules may be a logical separation, and in other implementations, these modules or other components can be combined together or separated in further components, according to a particular implementation. In one implementation, storage device 120 includes image data store 222 and feature-to-depth mapping data store 224. In one implementation, image converter 110 maintains image data store 222 and feature-to-depth mapping data store 224. Together these form a data set that may be used for more accurate 2D to 3D conversion. Image converter 110 can receive a 2D input video (e.g., from a user or a computer application program) that is to be converted to a 3D output video. Using motion information and feature-to-depth mapping functions generated for the 2D videos in image data store 222 and stored in the corresponding feature-to-depth mapping data store 224, the various modules of image converter 110 can automatically generate the 3D output image, as will be described below.

In one implementation, modules 211-218 are used to generate, from the images and videos in image data store 222, data stored in the feature-to-depth mapping data store 224. Image data store 222 may include, for example, various 2D images and/or videos that are to be converted to 3D. In one implementation, each 3D image (or frame of a 3D video) includes or is associated with a stereo image pair which, when viewed, creates an illusion of depth. Generally, the image pairs include two images (e.g., left image and right image) of the same subject, taken from slightly different viewpoints (roughly equal to the distance between a person's eyes). Thus, each point in the two images will have a slight offset (measured in pixels) that is proportional to the distance the point is from the viewpoint. This offset may be referred to as disparity.

Shot detection module 211 can perform video processing on a 2D video from image data store 222 to automatically detect transitions between shots or scenes in the video for the purpose of temporal segmentation of the video. Shot detection module 211 can split up the 2D video into basic temporal units called shots or scenes. A shot or scene may be a series of interrelated consecutive pictures or frames taken contiguously by a single camera and representing a continuous action in time and space. Upon identifying a shot or scene, shot detection module 211 may store one or more representative frames in image data store 222. The representative frames may be one example of the shot that shares visual qualities (e.g., colors, objects, textures, etc.) of most frames in the shot. Identifying different shots and scenes may be advantageous because different shots may have different disparities and/or motion values. By separating the 2D video into shots, image converter 110 may be ultimately able to generate more accurate 3D content from 2D input video.

Camera motion module 212 can determine a global camera motion value (or flow) for a 2D input video. In certain implementations, the camera used to capture a video may be moving at the time it is recording a scene or subject. For example, the camera may be held by a person in a vehicle while filming an exterior scene, or the camera may be stationary but panning across a scene (e.g., at a sporting event) to follow a subject. In other implementations, the camera may be moving in some other fashion. Any of these cases may result in a camera motion value being present in the captured video. In one implementation, camera motion module 212 uses a pyramidal Lucas-Kanade method to track features (e.g., shapes, figures, corners) in the frames of the 2D video. The pyramidal Lucas-Kanade method assumes that the flow is essentially constant in a local neighborhood of a pixel under consideration, and solves basic optical flow equations for all the pixels in that neighborhood by the least squares criterion. By combining information from several nearby pixels, the Lucas-Kanade method can often resolve the inherent ambiguity of the optical flow equation while not being very sensitive to image noise. Camera motion module 212 can apply the pyramidal Lucas-Kanade method to a selected subset of pixels in the frame of 2D video to determine an estimated optical flow. In one implementation, camera motion module 212 further uses a local outlier rejection technique to eliminate outlying motion values from consideration in the global camera motion. Camera motion module 212 can discretize features of the frame into a grid (e.g., 50×50 pixels) and apply RANSAC (Random Sample Consensus) within each grid cell to estimate a translational model. In another implementation, camera motion module 212 also uses an L1 camera model fitting method to get robust results. In another implementation, camera motion module 212 applies the homography camera model. The homography camera model may relate two images (e.g., consecutive frames of the 2D input video) with a Cartesian coordinate matrix. This matrix may be representative of the camera motion and camera motion module 212 can use the matrix to determine the location of a given pixel in a second frame based on its motion in relation to the location in a first frame. In one implementation, the matrix parameters may be determined based on a selected subset of feature points in the frames and the remaining per-pixel flow may be interpolated from these matrix parameters.

Dense motion module 213 can determine the total optical flow for each pixel in the frame of the 2D input video. In one implementation, dense motion module 213 uses a variational dense optical flow method to obtain a per-pixel flow. This method may determine motion vectors that describe the transformation between two frames of the 2D input video. The vectors may correspond to perceived motion of the pixels in the frames. Variational dense optical flow methods introduce a global constraint of smoothness to solve the aperture problem of conventional algorithms, which can result in coarse detection that is not well aligned with objects in the image. In another implementation, dense motion module 213 uses block matching to approximate the per-pixel flow. A block matching algorithm may provide a way of locating matching blocks (e.g., groups of pixels, usually in a square or rectangular formation) in a sequence of video frames for the purposes of motion estimation. This can be used to discover temporal redundancy in the video frames, and the motion can be estimated based on the location of the matching blocks in adjacent frames. In one implementation, dense motion module 213 uses a small maximum block range to increase accuracy. Block matching may provide sufficient accuracy for motion estimation while not being computationally intensive.

Local motion module 214 can determine the motion of objects within the video frames moving independently from the camera (i.e., the local motion). In one implementation, local motion module 214 subtracts the global motion from the dense motion for each pixel in the frame. The resulting motion value may be representative of the local motion. A stationary or background object in the frame should have a local motion value of zero, while a moving object should have some positive or negative value representative of the direction and speed of the motion. Local motion module 214 can store these values, for example, in feature-to-depth mapping data store 224.

Depth map generation module 215 can compute a depth map for a frame of a 2D input video based on the local motion values of the pixels in the frame, stored in feature-to-depth mapping data store 224. In one implementation, depth map generation module 215 applies a threshold to the local motion values to identify pixels that have a local motion value above the threshold. The threshold may be used to identify pixels representing an object in the scene that is actually moving. In one implementation, the threshold is relatively low so that any pixel having even a small local motion value will exceed the threshold. Any pixel that exceeds the threshold may be assigned a value of logic 1, and any pixel that does not exceed the threshold may be assigned a value of logic 0, or vice versa. Depth map generation module 215 can plot these resulting logic values based on pixel location to generate a rough depth map. In one implementation, this rough depth map may be referred to as a segmentation map. Depth map generation module 215 can store the resulting depth map in storage device 120.

Refinement module 216 can optionally refine the rough depth map generated by depth map generation module 215 in order to give more accurate results. In one implementation, refinement module 216 applies the Markov random field (MRF) algorithm to the rough depth map. If P is the set of all pixels in the frame, for each pixel p in the set P, refinement module 216 can assign a label {1: 1 (moving), 0 (static)}. Following the classical MRF formulation, refinement module 216 can find a label set L* minimizing the energy E(L):

$$E(L) = \sum_{p \in P} E_{motion}(l_p) + \lambda_C \sum_{p \in P} E_{color}(l_p) + \lambda \sum_{p \in P} \sum_{q \in N_p} E_{smooth}(l_p, l_q)$$

Refinement module 216 can set a high/low motion pixel as foreground with a low/high value $E_{motion}$. Pixels of similar colors having the same or different labels results in low/high value $E_{color}$. Pixels of similar locations having the same or different labels results in low/high value $E_{smooth}$. In one implementation, refinement module 216 uses graph cuts to efficiently minimize the energy function E(L). The result may be a refined depth map that more accurately reflects moving and stationary objects in the frame.

Feature-to-depth mapping module 217 can generate a feature-to-depth mapping function based on one or more features of the frame and the depth values of the pixels in the frame as determined by depth map generation module 215 and/or refinement module 216. In one implementation, the feature used to generate the function may be the local motion value. In other implementations, some other feature may be used, such as color. Each pixel of the frame has a known local motion value and may have a depth value determined and stored as metadata by depth map generation module 215. The feature-to-depth mapping function may aggregate the depth values for pixels of the same or similar local motion values, based on the assumption that objects in the image having the same or similar local motion values will also have a same or similar depth value. In other implementations, other features may be used to generate the feature-to-depth mapping function, either in place of or in addition to motion, such as color, texture, location, shape, etc. In another implementation, feature-to-depth mapping module 217 may combine (e.g., average) the depth values for pixels of a certain local motion value across multiple or all images in image data store 222, in order to generate the feature-to-depth mapping function. The resulting function can ultimately receive a local motion value (or other feature value) for a certain pixel or other point on a 2D input image as an input, and output a depth value for that pixel.

In one implementation, feature-to-depth mapping module 217 may generate multiple feature-to-depth mapping functions for a single image in image data store 222. Different functions may be generated, for example, for different regions of the image. In one implementation, an image from image data store 222 may be logically divided into a number of regions (e.g., two, four). Feature-to-depth mapping module 217 may treat each region as its own individual image and determine a feature-to-depth mapping function specific to that region in the manner described above. In one implementation, feature-to-depth mapping module 217 may store the multiple functions corresponding to the image in data store 224. In another implementation, however, the multiple functions may be combined (e.g., using a linear combination based on the distance from a pixel to the center of each region) into a single function that is stored in data store 224, for example. The linear combination may eliminate potential "boundary effects" generated by switching feature-to-depth mapping functions across the different regions.

Upon completion of generating the feature-to-depth mapping function, the feature-to-depth mapping function for the image from image data store 222 may be stored in a corresponding entry in feature-to-depth mapping data store 224. In one implementation, feature-to depth mapping data store 224 may have some other structure besides a database (e.g., a list of key-value pairs). In one implementation, feature-to-depth mapping data store 224 may be a separate data structure (as shown), however in other implementations, the mapping information may be stored in the metadata of image data store 222. Image converter 110 can use the feature-to-depth mapping data store 224 to automatically generate a 3D output image from a 2D input image.

Rendering module 218 may render a 3D output image (i.e., a stereo image pair) based on the input image and the depth values calculated by depth map generation module 215 and feature-to-depth mapping module 217. In one implementation, rendering module 218 uses depth image based rendering (DIBR) techniques to generate the 3D image. DIBR techniques can render a 2D image based on another 2D image and a per pixel depth map. The original 2D image becomes one of two views that make up a 3D image, while the DIBR-rendered 2D image becomes the second view. In one implementation, the original 2D image is the left view, while the rendered 2D image is the right view. In other implementations, this may be reversed. Given the per-pixel depth map, a displacement map may be generated indicating how much each pixel should move from the left view to the right view. The relationship between depth and displacement may be approximately linear; however, some parameters may be adjusted in order to control how much an object "pops out" of a screen or how much it appears to extend behind the screen. Once the displacement map is generated, the pixels may be shifted from the left view to the right view to render the right view, while making sure that pixels which are in front occlude pixels in the back if multiple pixels from the left view map to the same pixel in the right rendered image space. Once all the pixels have been shifted, there may still be some holes left in the rendered right view. An in-painting (image interpolation) technique may be employed to fill up the holes from the neighboring pixels in the rendered image. This yields the final rendered right view. In order to create high quality rendering, the rendering may be conducted in an intermediate higher resolution pixel grid by interpolating the left view and the per-pixel depth map. Once the rendered image is obtained also at the higher intermediate resolution, it can be scaled back to the desired resolution.

Figure 3:
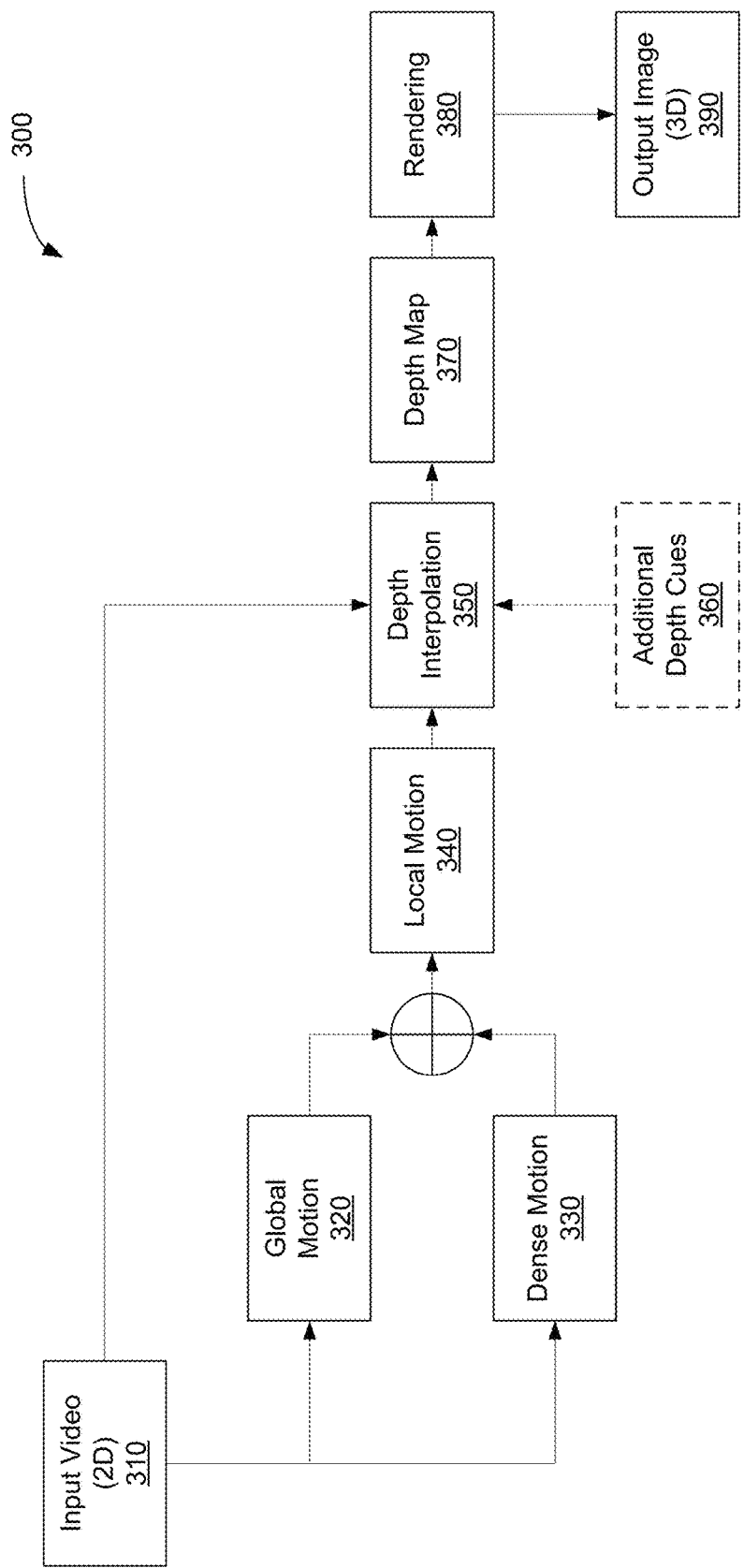
FIG. 3 is a block diagram illustrating an image conversion processing flow, according to some implementations.

FIG. 3 is a block diagram illustrating an image conversion processing flow, according to an implementation of the present disclosure. The various modules and components may be described in regards to their roles in converting monoscopic videos or images to stereoscopic 3D. In one implementation, the processing flow 300 begins with receiving a 2D input video at block 310. At block 320, the global camera motion for the video is determined using at least two frames of the video. In one implementation, camera motion module 212 estimates the global camera motion as described above. At block 330, the dense motion is determined for the input video. Dense motion module 213 may use variational dense flow methods or block matching to determine the dense motion flow for each pixel in the frames of the input video. The global motion and dense motion may be combined to generate the local motion at block 340. In one implementation, local motion module 214 subtracts the global motion from the dense motion to determine the local motion. At block 350, a depth interpolation may be performed to more accurately determine a depth value for each pixel in the video frame based on the local motion values. In one implementation, additional depth cues (e.g., color) may be combined with the motion cue to interpolate the depth values. The resulting depth values may be used to form a depth map at block 370. At block 380, the depth map may be used with rendering techniques (e.g., DIBR) to generate the 3D output image 390.

Figure 4:
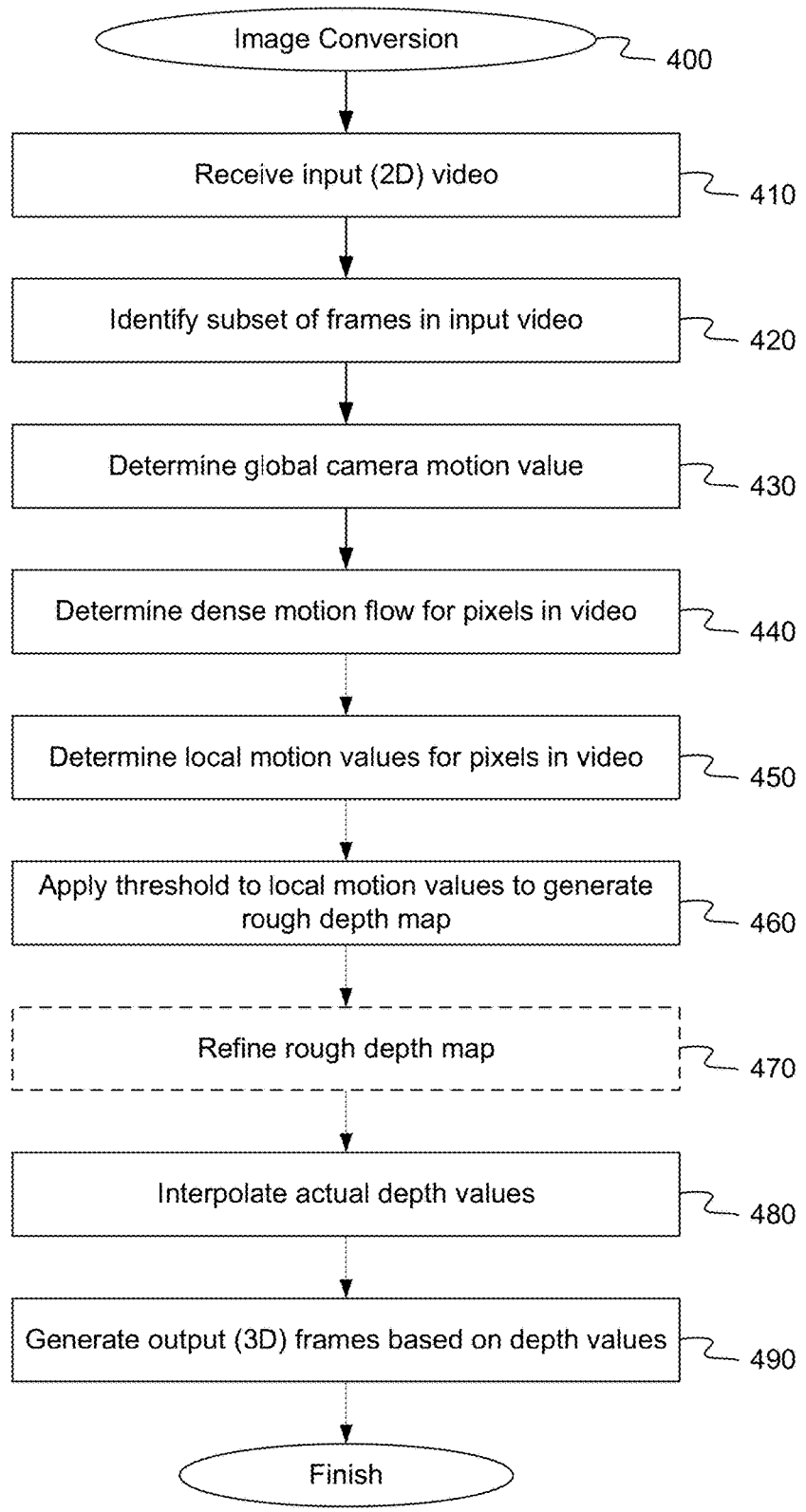
FIG. 4 is a flow diagram illustrating a method for image conversion, according to some implementations.

FIG. 4 is a flow diagram illustrating a method for image conversion, according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can generate a depth map using motion cues to convert monoscopic visual content to stereoscopic 3D. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by image converter 110 as shown in FIGS. 1 and 2.

Figure 5:
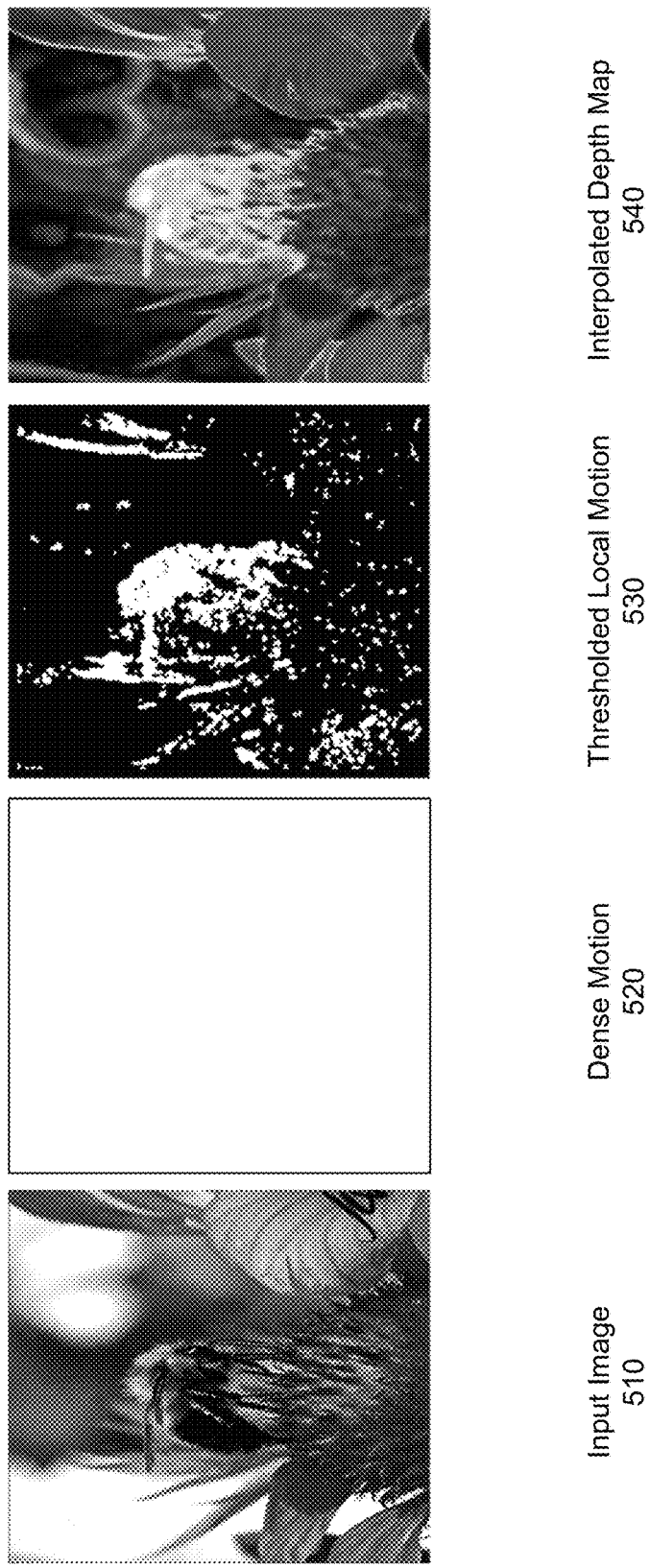
FIG. 5 is a diagram illustrating an image and depth maps used to convert the image to stereoscopic 3D, according to some implementations.

Referring to FIG. 4, at block 410, method 400 receives a 2D input video to be converted to 3D. The 2D input video may be uploaded by a user, downloaded over a network (e.g., the Internet) or received from some other source. At block 420, method 400 identifies a shot or scene in the 2D video. Shot detection module 211 can perform video processing on the 2D video to automatically detect transitions between shots or scenes in the video for the purpose of temporal segmentation of the video. Upon identifying a shot or scene, shot detection module 211 can store one or more representative frames in image data store 222. The representative frames may be one example of the scene that shares visual qualities (e.g., colors, objects, textures, etc.) of most frames in the scene. One example of the representative frame may be frame 510, illustrated in FIG. 5.

At block 430, method 400 determines a global camera motion value for the identified frames of the 2D video. The global camera motion value may represent the motion of the camera used to capture a scene with respect to the motion of objects within the scene. In one implementation, camera motion module 212 uses a pyramidal Lucas-Kanade method to track features (e.g., shapes, figures, corners) in the frames of the 2D video. Camera motion module 212 can also use a local outlier rejection technique to eliminate outlying motion values from consideration in the global camera motion.

At block 440, method 400 determines the dense motion flow for pixels in the frames of the 2D video. In one implementation, dense motion module 213 uses a variational dense optical flow method to obtain a per-pixel flow. This method may determine motion vectors that describe the transformation between two frames of the 2D input video. The vectors may correspond to perceived motion of the pixels in the frames. In another implementation, dense motion module 213 uses block matching to approximate the per-pixel flow. A block matching algorithm may provide a way of locating matching blocks (i.e., groups of pixels usually in a square or rectangular formation) in a sequence of video frames for the purposes of motion estimation. This can be used to discover temporal redundancy in the video frames, and the motion can be estimated based on the location of the matching blocks in adjacent frames. In one implementation, since the camera may be moving in addition to objects within the scene, each pixel may have an associated dense motion value. The dense motion value may represent the total movement of an object represented by each of the pixels in the image (i.e., in the perspective of the image, rather than in actual 3D space). Thus, in a case where the camera is moving, in addition to some objects in the scene moving, the dense motion values for each pixel may be indistinguishable from one another. One example of a depth map illustrating dense motion may be depth map 520, illustrated in FIG. 5. Since every pixel has some motion value, it may be difficult to distinguish moving objects within the frame. Image converter 110 should account for global camera motion, as will be described below.

At block 450, method 400 determines local motion values for the pixels in the frames of the 2D video. Local motion module 214 can determine the motion of objects within the video frames moving independently from the camera (i.e., the local motion). In one implementation, local motion module 214 finds a difference between the dense motion and the global motion for each pixel in the frame. The resulting motion value may be representative of the local motion. Local motion module 214 can store these values, for example, in feature-to-depth mapping database 224 data store 224 or as metadata with the frames of the videos themselves.

At block 460, method 400 applies a threshold to the local motion values to generate a rough depth map. Depth map generation module 215 can compute a depth map for a frame of 2D input video based on the local motion values stored in feature-to-depth mapping data store 224. In one implementation, depth map generation module 215 applies a threshold to the local motion values to identify pixels that have a local motion value above the threshold. In one implementation, the threshold is relatively low so that any pixel having even a small local motion value will exceed the threshold. Any pixel that exceeds the threshold may be assigned a value of logic 1, and any pixel that does not exceed the threshold may be assigned a value of logic 0, or vice versa. Depth map generation module 215 can plot these resulting logic values based on pixel location to generate a rough depth map. One example of the rough depth map may be depth map 530, illustrated in FIG. 5.

At block 470, method 400 may optionally refine the depth map generated at block 460. In one implementation, refinement module 216 applies the Markov random field (MRF) algorithm to the rough depth map. In another implementation, refinement module 216 uses graph cuts to efficiently de-noise the rough binary depth map. The result may be a refined depth map that more accurately reflects moving and stationary objects in the frame.

At block 480, method 400 interpolates the actual depth values for each pixel in the frame. In one implementation, feature-to-depth mapping module 217 generates a feature-to-depth mapping function based on one or more features of the frame and the depth values determined at block 460 and/or block 470. In one implementation, the feature used to generate the function may be the local motion value. In other implementations, some other feature may be used, such as color, in place of or in addition to motion. Certain pixels of the frame have a known local motion value and may have a depth value determined and stored as metadata by depth map generation module 215. The feature-to-depth mapping function may aggregate the depth values for pixels of the same or similar local motion values, based on the assumption that objects in the image having the same or similar local motion values will also have a same or similar depth value. The resulting function can ultimately receive a local motion value (or other feature value) for a certain pixel or other point on a 2D input image as an input, and output a depth value for that pixel. The output depth values may form an interpolated depth map. One example of the interpolated depth map may be depth map 540, illustrated in FIG. 5.

At block 490, method 400 generates a stereo pair for a 3D output image. In one implementation, rendering module 218 may render a 3D output image based on the frame of the 2D input video and the interpolated depth values determined at block 480. In one implementation, rendering module 218 may use depth image based rendering (DIBR) techniques to generate the 3D image. The output image may be stored or displayed for viewing by a user. In one implementation, the output image includes the input image, which is treated as the left view of a stereo pair, and a second image (e.g., based on the depth values), which is treated as the right view of the stereo pair. In other implementations, the position of these images may be reversed.

Figure 6:
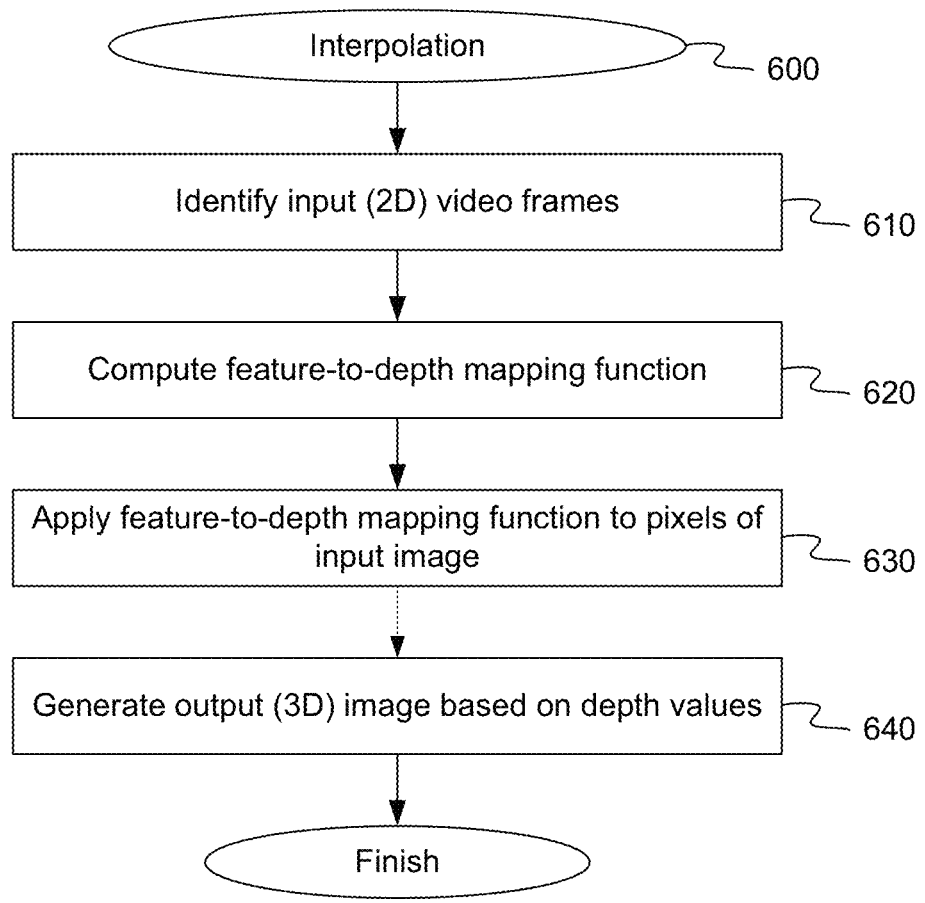
FIG. 6 is a flow diagram illustrating a method for interpolating depth values from a rough depth map, according to some implementations.

FIG. 6 is a flow diagram illustrating a method for interpolating depth values from a rough depth map, according to an implementation of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can generate interpolated depth values for an input image using a rough depth map associated with the image. In one implementation, method 600 may be an expansion of block 480, as shown in FIG. 4. In one implementation, method 600 may be performed by image converter 110 as shown in FIG. 1 and FIG. 2.

Referring to FIG. 6, at block 610, method 600 receives a 2D input image for conversion to 3D. The input image may be a frame or frames of the 2D input video and may be received from a user (e.g., through a user interface provided by image converter 110), from another computer application program (e.g., through an application interface, such as an API), or from some other source. Image converter 110 may also determine motion values for each pixel in the image using modules 212-214, as described above.

At block 620, method 600 generates a feature-to-depth mapping function for the input image based on a rough depth map associated with the image. In one implementation, feature-to-depth mapping module 217 can aggregate the depth values for pixels of the same or similar local motion values, based on the assumption that objects in the image having the same or similar motion value will also have the same or similar depth value. The resulting function can ultimately receive a local motion value (and/or other feature values, such as color) for a certain pixel or other point in the input image as an input and output a depth value for that pixel. The feature-to-depth mapping function may be stored, for example, in data store 224.

At block 630, method 600 applies the feature-to-depth mapping function computed at block 620 to the pixels in the input image to determine a depth value for each of the pixels. Feature-to-depth mapping module 217 can generate a resulting interpolated depth map for the input image. In one implementation, feature-to-depth mapping module 217 can apply local motion values (or other appropriate feature values) as inputs to the feature-to-depth mapping function generated at block 620. This results in a depth value being calculated for each pixel of the input image. The depth values may be combined, based on the location of their associated pixels, to form a depth map.

At block 640, method 600 generates a stereo pair for a 3D output image. In one implementation, image rendering module 218 can render a 3D output image based on the input image and the depth values calculated by feature-to-depth mapping module 217 at block 630. In one implementation, rendering module 218 can use depth image based rendering (DIBR) techniques to generate the 3D image.

Figure 7:
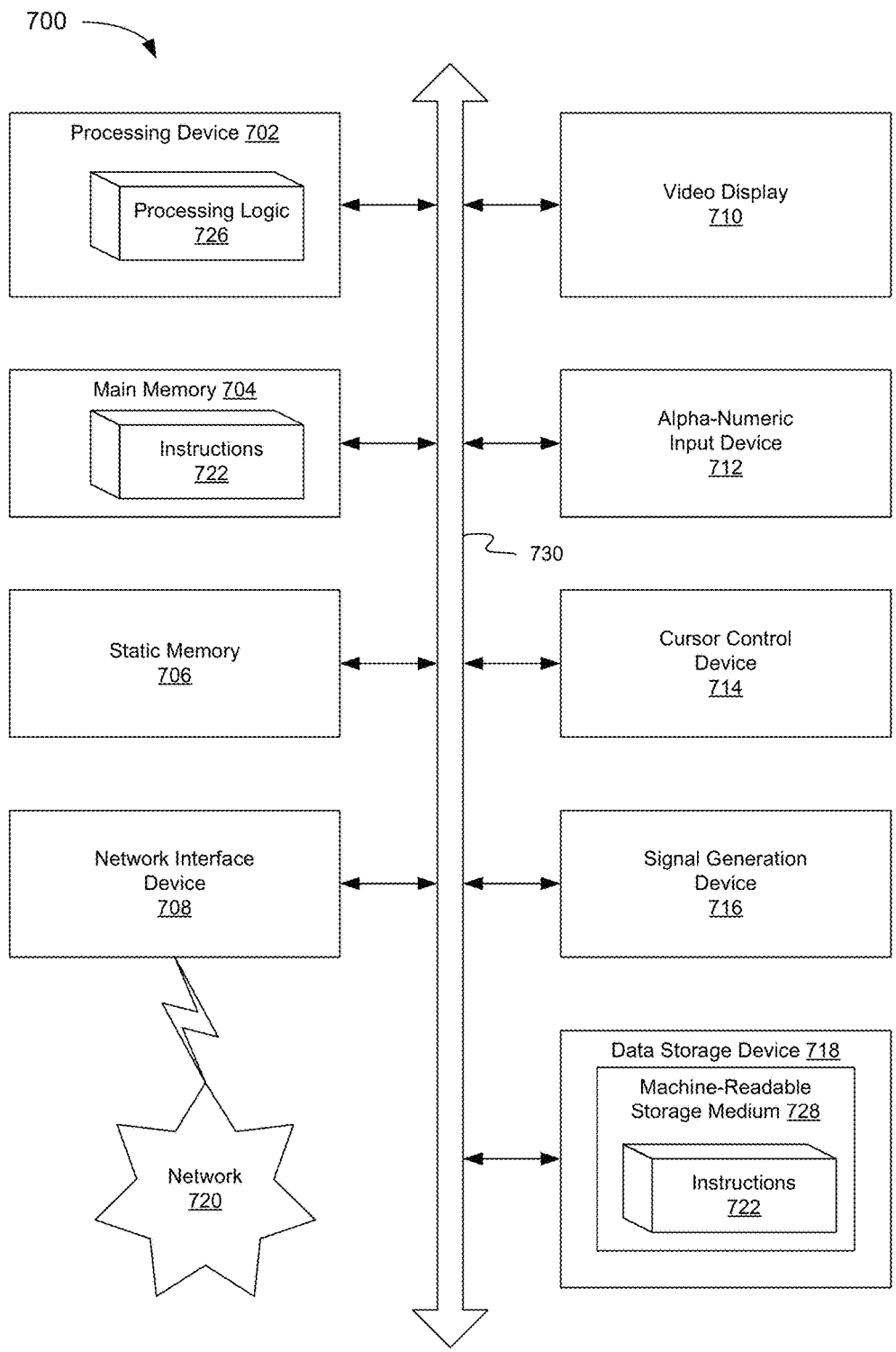
FIG. 7 is a block diagram illustrating an exemplary computer system, according to some implementations.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 700 may be representative of a server, such as server 102, running image converter 110.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for generating a depth map using motion cues for conversion of monoscopic video to stereoscopic 3D, as described herein. While the machine-readable storage medium 728 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present invention. It will be apparent to one skilled in the art, however, that at least some implementations of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
identifying a subset of frames in a two-dimensional video, the subset of frames comprising moving objects and static objects;
determining a global camera motion value for the subset of frames;
determining a dense motion value for a plurality of pixels in the subset of frames;
comparing, by a processing device, the global camera motion value and the dense motion value to calculate a local motion value for each of the plurality of pixels;
determining, for each of the plurality of pixels, whether a local motion value of a respective pixel satisfies a first threshold condition or a second threshold condition;
responsive to the local motion value of the respective pixel satisfying the first threshold condition, assigning a first value to represent the local motion value of the respective pixel, and responsive to the local motion value of the respective pixel satisfying the second threshold condition, assigning a second value to represent the local motion value of the respective pixel, wherein the first value indicates that the respective pixel is associated with one of the moving objects, and the second value indicates that a corresponding pixel is associated with one of the static objects, wherein the assigning of the first and second values results in the plurality of pixels each being assigned either the first value or the second value;
generating a rough depth map for the subset of frames using assigned first and second values of the plurality of pixels and locations of the plurality of pixels in the subset of the frames;
interpolating, based on the rough depth map, a depth value for each of the plurality of pixels in the subset of frames; and
rendering a three-dimensional video from the subset of frames using the depth value for each of the plurality of pixels.

2. The method of claim 1, wherein the global camera motion value represents a movement of a camera that captured the two-dimensional video.

3. The method of claim 1, wherein the dense motion value represents a total movement of an object represented by each of the plurality of pixels.

4. The method of claim 1, wherein comparing the global camera motion value and the dense motion value comprises determining a difference between the global camera motion value and the dense motion value to identify the local motion value for each of the plurality of pixels representing a movement of an object within video relative to a camera.

5. The method of claim 4, further comprising:
applying a threshold to the local motion value for each of the plurality of pixels.

6. The method of claim 1, wherein interpolating the depth value of each pixel comprises:

computing, a feature-to-depth mapping function based on the rough depth map; and
applying the feature-to-depth mapping function to the plurality of pixels in the subset of frames.

7. The method of claim 1, further comprising:
refining the rough depth map by applying a Markov Random Field (MRF) algorithm to the rough depth map.

8. A non-transitory machine-readable storage medium storing instructions which, when executed, cause a data processing system to perform a method comprising:
identifying a subset of frames in a two-dimensional video, the subset of frames comprising moving objects and static objects;
determining a global camera motion value for the subset of frames;
determining a dense motion value for a plurality of pixels in the subset of frames;
comparing, by a processing device, the global camera motion value and the dense motion value to calculate a local motion value for each of the plurality of pixels;
determining, for each of the plurality of pixels, whether a local motion value of a respective pixel satisfies a first threshold condition or a second threshold condition;
responsive to the local motion value of the respective pixel satisfying the first threshold condition, assigning a first value to represent the local motion value of the respective pixel, and responsive to the local motion value of the respective pixel satisfying the second threshold condition, assigning a second value to represent the local motion value of the respective pixel, wherein the first value indicates that the respective pixel is associated with one of the moving objects, and the second value indicates that a corresponding pixel is associated with one of the static objects, wherein the assigning of the first and second values results in the plurality of pixels each being assigned either the first value or the second value;
generating a rough depth map for the subset of frames using assigned first and second values of the plurality of pixels and locations of the plurality of pixels in the subset of the frames;
interpolating, based on the rough depth map, a depth value for each of the plurality of pixels in the subset of frames; and
rendering a three-dimensional video from the subset of frames using the depth value for each of the plurality of pixels.

9. The non-transitory machine-readable storage medium of claim 8, wherein the global camera motion value represents a movement of a camera that captured the two-dimensional video.

10. The non-transitory machine-readable storage medium of claim 8, wherein the dense motion value represents a total movement of an object represented by each of the plurality of pixels.

11. The non-transitory machine-readable storage medium of claim 8, wherein comparing the global camera motion value and the dense motion value comprises determining a difference between the global camera motion value and the dense motion value to identify the local motion value for each of the plurality of pixels representing a movement of an object within video relative to a camera.

12. The non-transitory machine-readable storage medium of claim 11, the method further comprising:
applying a threshold to the local motion value for each of the plurality of pixels.

13. The non-transitory machine-readable storage medium of claim 8, wherein interpolating the depth value of each pixel comprises:
computing, a feature-to-depth mapping function based on the rough depth map; and
applying the feature-to-depth mapping function to the plurality of pixels in the subset of frames.

14. The non-transitory machine-readable storage medium of claim 8, the method further comprising:
refining the rough depth map by applying a Markov Random Field (MRF) algorithm to the rough depth map.

15. A system comprising:
a processing device; and
a memory coupled to the processing device; and
an image converter, executable by the processing device from the memory, to:
identify a subset of frames in a two-dimensional video, the subset of frames comprising moving objects and static objects;
determine a global camera motion value for the subset of frames;
determine a dense motion value for a plurality of pixels in the subset of frames;
compare the global camera motion value and the dense motion value to calculate a local motion value for each of the plurality of pixels;
determine, for each of the plurality of pixels, whether a local motion value of a respective pixel satisfies a first threshold condition or a second threshold condition;
responsive to the local motion value of the respective pixel satisfying the first threshold condition, assign a first value to represent the local motion value of the respective pixel, and responsive to the local motion value of the respective pixel satisfying the second threshold condition, assign a second value to represent the local motion value of the respective pixel, wherein the first value indicates that the respective pixel is associated with one of the moving objects, and the second value indicates that a corresponding pixel is associated with one of the static objects, wherein the assigning of the first and second values results in the plurality of pixels each being assigned either the first value or the second value;
generate a rough depth map for the subset of frames using assigned first and second values of the plurality of pixels and locations of the plurality of pixels in the subset of the frames;
interpolate, based on the rough depth map, a depth value for each of the plurality of pixels in the subset of frames; and
render a three-dimensional video from the subset of frames using the depth value for each of the plurality of pixels.

16. The system of claim 15, wherein the global camera motion value represents a movement of a camera that captured the two-dimensional video.

17. The system of claim 15, wherein the dense motion value represents a total movement of an object represented by each of the plurality of pixels.

18. The system of claim 15, wherein comparing the global camera motion value and the dense motion value comprises determining a difference between the global camera motion value and the dense motion value to identify the local motion value for each of the plurality of pixels representing a movement of an object within video relative to a camera.

19. The system of claim 18, the image converter further to:
  apply a threshold to the local motion value for each of the plurality of pixels.

20. The system of claim 15, wherein interpolating the depth value of each pixel comprises:
  computing, a feature-to-depth mapping function based on the rough depth map; and
  applying the feature-to-depth mapping function to the plurality of pixels in the subset of frames.

* * * * *